United States Patent [19]

Havewala et al.

[11] Patent Number: 5,482,526
[45] Date of Patent: Jan. 9, 1996

[54] METHOD FOR FORMING A NON-HYGROSCOPIC ZINC-PHOSPHATE COMPOUND AND A ZINC-PHOSPHATE GLASS

[75] Inventors: Noshir B. Havewala, Corning; Kevin T. Morris; Robert D. Shoup, both of Hammondsport, all of N.Y.

[73] Assignee: Corning Incorporated, Corning, N.Y.

[21] Appl. No.: 178,417

[22] Filed: Feb. 17, 1994

[51] Int. Cl.⁶ ............................. C03B 5/16; C01B 15/16; C01B 25/26; C03C 3/17
[52] U.S. Cl. ........................ 65/134.1; 65/135.9; 65/85; 423/305; 423/309; 423/314; 501/48; 501/76
[58] Field of Search ................. 65/21.1, 134.1, 65/134.3, 135.9, 85; 423/314, 305, 309; 501/45, 48, 74, 76

[56] References Cited

U.S. PATENT DOCUMENTS

| | | | |
|---|---|---|---|
| 2,601,395 | 6/1952 | Hatch | 423/314 |
| 3,360,332 | 12/1967 | Fuchs et al. | 23/106 |
| 3,838,998 | 10/1974 | Matthews et al. | 65/21 |
| 3,897,236 | 8/1975 | Roberts | 71/1 |
| 3,955,956 | 5/1976 | Terner | 65/135.9 |
| 4,049,779 | 9/1977 | Ropp | 423/309 |
| 4,059,669 | 11/1977 | Thomas | 264/319 |
| 4,126,665 | 11/1978 | Ropp | 423/314 |
| 4,326,873 | 4/1982 | Reilly et al. | 65/134 |
| 4,526,765 | 8/1985 | Ito et al. | 423/306 |
| 4,846,853 | 7/1989 | Chang et al. | 423/309 |
| 4,940,677 | 8/1990 | Beall et al. | 501/45 |
| 4,996,172 | 2/1991 | Beall et al. | 501/45 |
| 5,043,369 | 8/1991 | Bahn et al. | 523/466 |
| 5,071,795 | 12/1991 | Beall et al. | 501/45 |
| 5,162,267 | 11/1992 | Smyth | 501/45 |
| 5,328,874 | 7/1994 | Beall et al. | 501/45 |

FOREIGN PATENT DOCUMENTS 682636 3/1964 Canada .................. 423/309

OTHER PUBLICATIONS

Hackh's Chemical Dictionary, J. Grant, Copyright 1969, p. 47, Fourth Edition.

*Primary Examiner*—W. Gary Jones
*Assistant Examiner*—Steven P. Griffin
*Attorney, Agent, or Firm*—Angela N. Nwaneri

[57] ABSTRACT

The instant invention describes a method for preparing a stable, anhydrous non-hygroscopic zinc phosphate compound which is suitable for use as a batch material in the preparation of zinc-phosphate glasses. This method comprises three basic steps: first, forming an aqueous slurry mixture by intimately mixing a mixture containing phosphoric acid and a zinc-containing compound whereby the so-formed slurry mixture is comprised of a mixture of zinc hydrogen phosphates and exhibits a $P_2O_5/ZnO$ weight ratio range between about 1.2 to 2.0; second, heating the so-formed slurry mixture to a temperature and for a time sufficient to achieve both a removal of a sufficient amount of water and the phase transformation of the zinc hydrogen phosphates resulting in zinc-phosphate material comprised of granular solid mixture of zinc metaphosphates and zinc pyrophosphate and third, cooling the zinc-phosphate material to room temperature.

13 Claims, 2 Drawing Sheets

METHOD FOR FORMING A NON-HYGROSCOPIC ZINC-PHOSPHATE COMPOUND AND A ZINC-PHOSPHATE GLASS

RELATED APPLICATION

U.S. patent application Ser. No. 08/178,418, filed concurrently herewith by N. B. Havewala under the title "Method for Forming Zinc-Phosphate Based Glasses", and assigned to the same assignee as the present application.

FIELD OF THE INVENTION

This invention relates to a novel method of forming a zinc phosphate compound and more particularly, the invention relates to a method of forming a stable, anhydrous non-hygroscopic zinc phosphate compound suitable as a batch material for zinc-phosphate glasses.

BACKGROUND OF THE INVENTION

A new family of materials was disclosed in U.S. Pat. No. 5,043,069 (Bahn et al.), which disclosed the co-extrusion of high temperature polymers with low temperature phosphate glasses and the subsequent injection molding of the glass-polymer materials. The glasses utilized, by necessity, were required to have low softening points which permit low mixing/extrusion temperatures, viz., below about 400° C. Glasses having base compositions within the general zinc phosphate system were found to be especially suitable for the glass component of these glass-polymer alloys; they exhibited low melting temperatures in the 900°–1000° C. range and softening points below about 350° C. Illustrative is that glass composition system disclosed in U.S. Pat. No. 4,940,677 (Beall et al.).

The usual process in the prior art preparation of these zinc-phosphate glasses comprised mixing selected batch materials together in desired proportions and heating the mixture to elevated temperatures to form a melt from which glass particles could thereafter be formed. The resulting glass particles were thereafter mixed with the desired polymer in accordance with the Bahn et al. disclosure and processed to form the glass polymer alloys.

Typically in the past, the batch material source of phosphate in these glasses was monoammonium phosphate. The disadvantage in using this conventional source of phosphate is that environmental concerns dictate the necessity of using pollution control systems to collect the ammonia byproduct. Furthermore, monoammonium phosphate as a batch material is quite costly, when compared to other sources of phosphate such as phosphoric acid. Therefore, methods of incorporating the phosphate into the batch without the use of monoammonium phosphate were sought.

Although there are commercially available forms of zinc phosphate which can be used in the batching zinc phosphate glasses, the zinc-to-phosphate ratio exhibited by these materials is not appropriate for forming the glasses disclosed in the above-referenced Beall et al. patent. Specifically, these sources were not rich enough in phosphate in order to form those glasses; i.e., in utilizing these commercially available zinc phosphate sources, the required amount of zinc batch material is met prior to that of the phosphate. This, in turn, would require an additional source of phosphate, i.e., most likely monoammonium phosphate. Thus, there would be no advantage in utilizing these materials as the source of the phosphate.

SUMMARY OF THE INVENTION

Hence, the instant invention is directed to a method for preparing a stable, anhydrous non-hygroscopic zinc phosphate compound which is suitable for use as a batch material in the preparation of zinc-phosphate glasses. This method comprises the three basic steps of: first, forming an aqueous slurry mixture by intimately mixing a mixture containing phosphoric acid and a zinc-containing compound whereby the so-formed slurry mixture is comprised of a mixture of zinc hydrogen phosphates and exhibits a $P_2O_5/ZnO$ weight ratio range between about 1.2 to 2.0; second, heating the so-formed slurry mixture to a temperature and for a time sufficient to achieve both a removal of a sufficient amount of water and the phase transformation of the zinc hydrogen phosphates resulting in zinc-phosphate material comprised of a granular solid mixture of zinc metaphosphates and zinc pyrophosphate and third, cooling the zinc-phosphate material to room temperature.

Once formed, this two component zinc-phosphate material can be crushed to the appropriate particle size and used as a conventional raw material in the formation of zinc phosphate glasses. In other words, this dry solid material after being crushed into particles may be mixed with the necessary additional batch materials and conventionally melted to form a zinc-phosphate based glass within the composition range disclosed in Beall et al.

DETAILED DESCRIPTION OF THE INVENTION

As contemplated, this invention is directed to a method for preparing a stable, anhydrous, non-hygroscopic zinc phosphate compound which is suitable for use as a batch material in the preparation of zinc-phosphate glasses. This method is comprised of a series of steps, the first consisting of forming an aqueous slurry mixture containing phosphoric acid and a zinc-containing compound whereby the $P_2O_5/ZnO$ weight ratio of the slurry mixture ranges from 1.2 to 2.0. Once formed in the proper proportions and intimately mixed, the so-formed slurry mixture comprised a mixture of zinc hydrogen phosphates represented by the following chemical formulas: $ZnH_4P_2O_8.2H_2O$ and $Zn(HPO_4).H_2O$.

The phosphoric acid and the zinc compound react exothermically to form the hydrated zinc phosphates. Assuming use of the preferred compound ZnO, the reaction may be represented by the following equation:

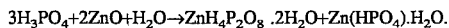

$$3H_3PO_4 + 2ZnO + H_2O \rightarrow ZnH_4P_2O_8 \cdot 2H_2O + Zn(HPO_4) \cdot H_2O.$$

For the purposes of this invention, the phosphoric acid may be in the form of ortho, meta, pyro, hydro or anhydrous phosphoric acid. Any convenient or available source of phosphoric acid may be used. In general, ortho phosphoric acid is widely available and is a convenient form for use in accordance with this invention. It is usually sold in the form of an aqueous solution, e.g., 85% ortho phosphoric acid.

The zinc compound suitable for purposes of the invention may be in the form of an oxide, carbonate or other compound which upon being combined with the phosphoric acid will form an appropriate slurry mixture which will result in the formation of the desired non-hygroscopic zinc phosphate material. However, it should be noted that the easiest, least expensive and preferred source of the zinc is zinc oxide.

Figure 1:
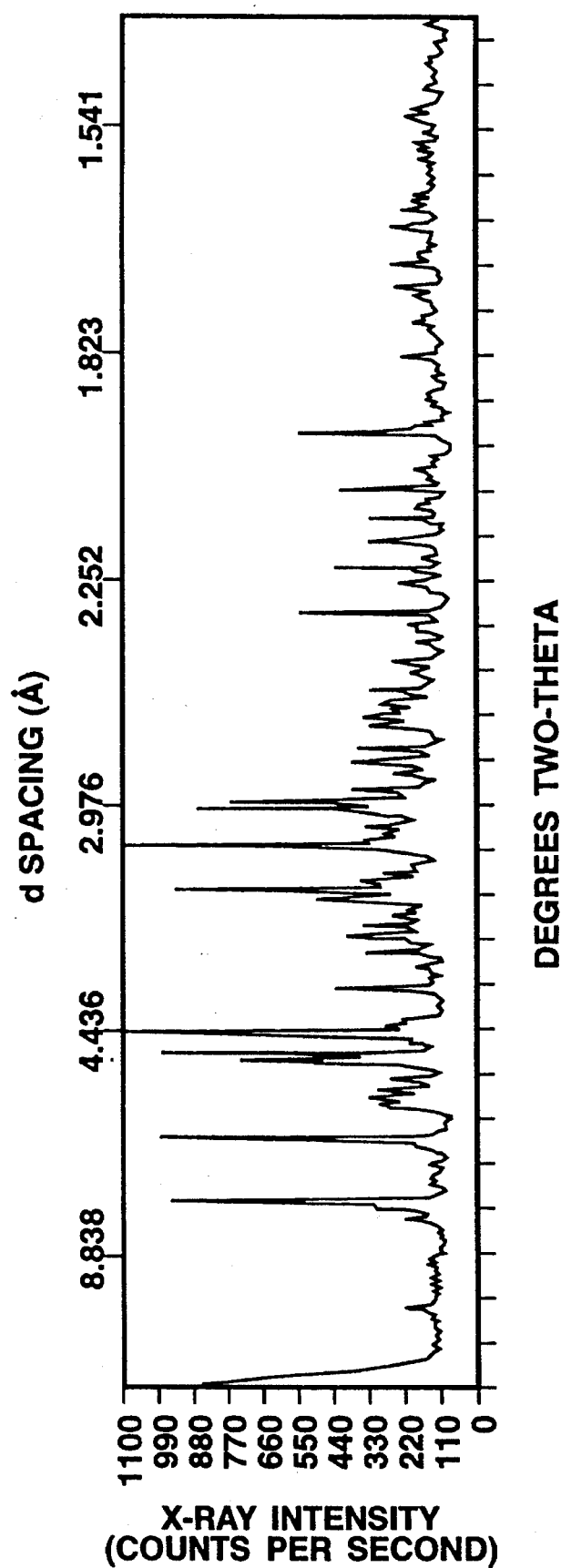
FIG. 1 is typical X-ray diffraction pattern for the zinc hydrogen phosphate compound.

The so-formed slurry mixture at this stage, when dried and cooled, forms a hydrated zinc-phosphate mixture as represented by the X-ray diffraction pattern depicted in FIG. 1. Although this hydrated zinc-phosphate is rich enough in $P_2O_5$, it would not be suitable as the batch material for the phosphate glass. In addition to the material being hygroscopic and thus readily absorbing water, it is not free flowing, the solid is sensitive to heat and pressure, and it can not be readily crushed.

The next step in the inventive process involves the heating of the so-formed slurry mixture to a temperature and for a time sufficient to result in the phase transformation of the zinc hydrogen phosphates into a mixture containing zinc metaphosphates and zinc pyrophosphates. Furthermore, this heating step is undertaken in order to remove a sufficient amount of the water from the so-formed slurry mixture such that the material formed is a solid granular material, i.e., the formation of zinc-phosphate material comprising a solid granular mixture of zinc metaphosphates and zinc pyrophosphates. It is most desirable that the resultant solid granular zinc phosphate material mixture exhibit a water content no greater than 5% by weight. In the most preferred embodiment, the so-formed slurry mixture should be heated to a temperature of at least about 400° C. for approximately 1 hour in order to achieve both the water removal and the desired phase transformation. However, it is imperative to note that the phase transformation involves heat and mass transfer; thus, one skilled in the art realizes that the reaction time, i.e., the time maintained at least 400° C., will vary and depend on factors such as particle size and surface-to-volume ratio.

It is believed that the phase transformation from the hygroscopic zinc hydrogen phosphate mixture to the stable non-hygroscopic mixture of zinc(pyro/meta)phosphates may be represented by the following equation:

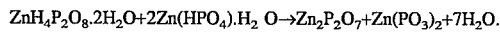

$$ZnH_4P_2O_8 \cdot 2H_2O + 2Zn(HPO_4) \cdot H_2O \rightarrow Zn_2P_2O_7 + Zn(PO_3)_2 + 7H_2O.$$

Figure 2:
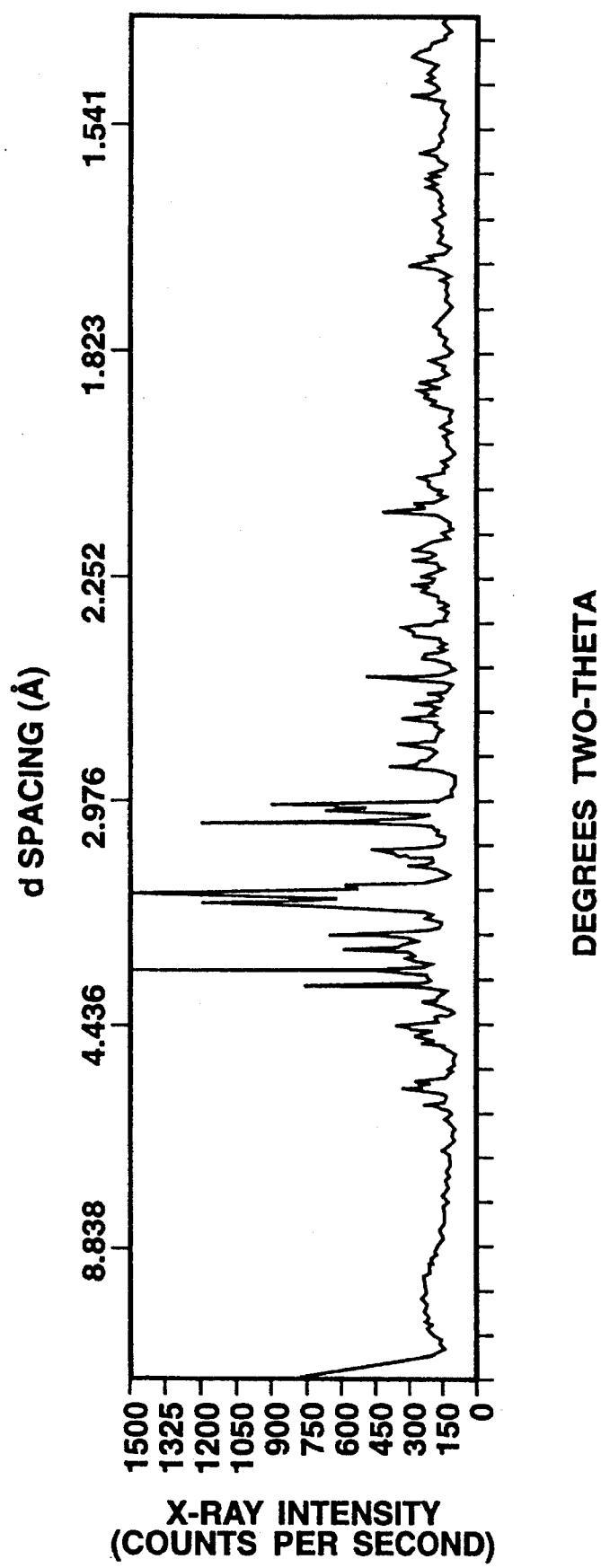
FIG. 2 is an X-ray diffraction illustrating the typical pattern for the inventive, stable, non-hygroscopic compound.

Lastly, the resultant granular solid zinc-phosphate material mixture is cooled to room temperature to obtain the desired non-hygroscopic zinc phosphate material. As disclosed above, the resultant material formed utilizing this process comprises a mixture of zinc pyrophosphates ($Zn_2P_2O_7$) and zinc metaphosphates ($Zn(PO_3)_2$). The X-ray diffraction pattern depicted in FIG. 2 is representative of the desired stable anhydrous zinc-phosphate material formed using this inventive process.

It has been determined that the most proficient technique for accomplishing the heating step involves a two step process; a 200° C. period during which a substantial amount of the water is removed from the so-formed slurry mixture and a 400° C. period during which the actual phase transformation is accomplished. The initial water removal step is best accomplished by placing the wet so-formed slurry material in a container which possessed an organic, non-stick coating, such as TEFLON® (tetrafluoroethylene), a fluorocarbon resin developed by DuPont in Wilmington, Del. The phase transformation step is best accomplished by placing the partially dried material in another type of container, e.g., an aluminum tray. It became desirable to use two separate containers because prior to a removal of a substantial amount of the water, the so-formed slurry mixture strongly adhered to any container not possessing a non-stick coating and, because the non-stick coatings found operable which were commercially available comprised organic materials could not withstand the desired phase transformation temperature. As described above, it is necessary to heat the material to this temperature in order to achieve the desired phase transformation from zinc hydrogen phosphates to the mixture of (pyro/meta)phosphates. It is imperative to note that if a commercially available non-stick coating was available which could withstand temperatures of up to at least 400° C. this would therefore eliminate the reasoning for utilizing two steps in the heating of the so-formed slurry mixture to form the solid granular zinc-phosphate material. Lastly, it should also be noted that both drying steps (or one, if that is the case) can be achieved in any dryer or heater capable of attaining and maintaining temperatures of at least 400° C.

Once an initial amount of zinc-phosphate material has been formed using the proficient and preferred two step heating method, another more proficient and continuous method of producing the zinc-phosphate material may be substituted for the two-step heating process. In this method, the initial slurry is formed by adding the phosphoric acid to a mixture comprised of the ZnO powder and an amount of non-hygroscopic zinc-phosphate solid granular material produced using the above described methods. This slurry mixture may then be dried and phase transformed (the portion of the slurry which needs to be transformed) by heating the material in a rotary dryer to the required temperature of 400° C. The addition of the zinc-phosphate material, in amounts of up to 50% (by weight) of the total slurry mixture, minimizes sticking to a point whereby the heating step may take place in one step, rather than two. Once the zinc phosphate material is dried and transformed into the desired solid granular zinc-phosphate material mixture, a portion of the so-formed material may be then recombined with additional ZnO powder and phosphoric acid and the procedure just outlined above may be repeated. This feature renders possible a continuous process for the production of (pyro/meta) phosphate.

As an alternative to the use of heaters or dryers, it is contemplated that the heating step may be accomplished through the use of high temperature spray drying in conjunction with the use of a fluidized bed process. It has been determined that the nozzle temperature of the spray dryer should be at least 175° C. while the fluidized bed should be operated at least 400° C. with a residence time of at least one hour. The advantage of these methods of heating is that direct particles of a zinc phosphate material may be formed thus, avoiding the crushing step required to form batch particles for use in glass bathing.

Once formed, this two component zinc-phosphate material can, when necessary, be crushed to the appropriate particle size and used as a conventional raw material in the formation of zinc phosphate glasses. In other words, this crushed dry solid material may thereafter be mixed with the necessary additional batch materials and conventionally melted to form a zinc phosphate glass preferably within the following composition range disclosed in the earlier described Beall reference, expressed in terms of mole percent on the oxide basis, of at least 65% total of 10–55% ZnO, 28–40% $P_2O_5$, 10–35% $R_2O$, wherein $R_2O$ consists of at least two alkali metal oxides in the indicated proportions selected from the group consisting of 0–25% $Li_2O$, 0–25% $Na_2O$, and 0–25% $K_2O$, and up to 35% total of optional ingredients in the indicated proportions selected from the group consisting of 0–10% $Al_2O_3$, 0–15% $B_2O_3$, 0–15% $Cu_2O$, 0–25% $Sb_2O_3$ 0–35% PbO, 0–35% $SnO$, 0–5% $ZrO_2$, 0–4% $SiO_2$, 0–20% MgO, 0–20% CaO, 0–20 % SrO, 0–20% BaO and 0–10% MnO, 0–10% $WO_3$, 0–10% $MoO_3$, 0–5% rare earth metal oxide and 0–5% F, as analyzed in weight percent, wherein $Al_2O_3+B_2O_3$ does not exceed 15%, $WO_3+MoO_3$ does not exceed 15%, and MgO+CaO+SrO+BaO+

MnO does not exceed 20%. In addition to the elimination of the use of monoammonium phosphate and hence, the elimination of pollution control systems, it is imperative to note that the glass so-formed using the non-hygroscopic zinc-phosphate material in the original batch is of a better quality than phosphate glasses formed using the conventional monoammonium phosphate raw material, i.e., better homogeneity and a lower seed count. It is theorized that this increase in glass quality is a direct result of the intimate mixing which occurs during the inventive method of forming the zinc phosphate material which, in turn, leads to an improved melting performance in the overall batch.

The following examples are intended to illustrate the invention without being deemed limitative thereof:

EXAMPLE 1

A total of 213.3 lbs. (96.75 kg.) of orthophosphoric acid ($H_3PO_4$.85% aqueous solution) was added to 101.3 (45.95 kg.) lbs of zinc oxide (ZnO) powder, technical grade 399 sold by the Zinc Corporation of America, Monaca, Pa. The resulting slurry had a $P_2O_5$/ZnO weight ratio of approximately 1.3 and a pH of about between 2–3. The slurry was then intimately mixed for one hour in a Ross Double Planetary mixer marketed by the Charles Ross & Sons Company, Hauppauge, N.Y., during which time the exothermic reaction took place resulting in a so-formed slurry mixture which contained zinc hydrogen phosphates. Specifically, this slurry mixture following the removal of a substantial portion of the water would, consist of mixture of hydrated zinc hydrogen phosphate compounds as represented by the X-ray diffraction patterns depicted in FIG. 1. This slurry mixture was then placed in a vessel containing a non-stick TEFLON® surface and heated to 200° C. for approximately 1 hour resulting in the removal of approximately 15% of the water to form a paste-like mixture. This paste-like mixture was then transferred to an aluminum tray and further heated to 400° C. in order to effect the phase transformation to the zinc metaphosphate and zinc pyrophosphate mixture; the X-ray analysis shown in FIG. 2 is typical of the mixture desired.

A total of 235.95 lbs. (107.03 kg.) of non-hygroscopic zinc-phosphate material was produced; 25% of the original starting material was lost as free water.

EXAMPLE 2

A total of 642.9 lbs (291.62 kg.) of the product of Example 1 was ground to an average particle ranging from 0.063 to 0.420 mm and batched with the following ingredients:

18.1 lbs. (8.21 kg.) Alumina 51.3 lbs. (23.27 kg.) lithium carbonate 120.3 lbs. (54.57 kg.) sodium tripolyphosphate 68.0 lbs. (30.85 kg.) potassium carbonate 76.5 lbs. (34.70 kg.) tin(II) oxide 16.2 lbs. (7.35 kg.) zinc oxide 2.0 lbs. (0.91 kg.) carbocite These batch materials were compounded and automatically tumble-mixed in order to secure a uniformly mixed batched, and placed into continuous glass melter. The glass batch was then melted and maintained at a temperature of approximately 1100° C. for a period of approximately one hour. The resultant glass was subsequently drigaged and sieved to form glass particles exhibiting an average particle size of approximately between about 0.177 mm to 0.841 mm. The glass as formed possessed the following analyzed composition:

| Component | Weight percent |
|---|---|
| $P_2O_5$ | 46.2 |
| $Al_2O_3$ | 1.85 |
| $Li_2O$ | 1.96 |
| $Na_2O$ | 5.13 |
| $K_2O$ | 4.46 |
| ZnO | 32.5 |
| $SnO_2$ | 7.8 |

While this invention has been exemplified with respect to specific processing techniques and conditions, specific ingredients and amounts thereof, and utilities, all variations thereof obvious to one skilled in the art are intended to be included within the spirit and purview of this application and the scope of the appended claims. For example, as is the case with standard glassmaking practice, for the actual formation of the glass, it is only necessary to ensure that the batch materials are mixed together thoroughly and then melted at temperatures which will ensure a homogenous melt without excessive volatilization, and that the melt is thereafter cooled and shaped into a glass body of a desired geometry which is customarily annealed.

We claim:

1. A method for preparing a stable, anhydrous non-hygroscopic zinc phosphate compound comprising the steps of:

(a) forming an aqueous slurry mixture by intimately mixing a mixture containing phosphoric acid and a zinc-containing compound whereby the so-formed slurry mixture is comprised of a mixture of zinc hydrogen phosphates and exhibits a $P_2O_5$/ZnO weight ratio range from between about 1.2 to 2.0; and, (b) heating the so-formed slurry mixture to a temperature and for a time sufficient to achieve both a removal of a sufficient amount of water from the so-formed slurry mixture and a phase transformation of the zinc hydrogen phosphates, whereby the resultant zinc-phosphate material comprises a solid granular mixture of zinc metaphosphates and zinc pyrophosphates; and, (c) cooling the zinc-phosphate material to room temperature.

2. The method of claim 1 wherein the zinc hydrogen phosphate is a mixture of $ZnH_4P_2O_8.2H_2O$ and $Zn(HPO_4).H_2O$.

3. The method of claim 1 wherein the zinc metaphosphates are represented by the chemical formula $Zn(PO_3)_2$ and the zinc pyrophosphate are represented by the chemical formula $Zn_2P_2O_7$.

4. The method of claim 1 wherein in step (b) the so-formed slurry mixture is heated to at least about 400°C. for at least about 1 hour.

5. The method of claim 1 wherein the heating of the so-formed slurry mixture is accomplished through the combination of high temperature spray drying and fluidized bed drying.

6. A method for preparing a zinc phosphate glass comprising the steps of:

(a) forming an aqueous slurry mixture by intimately mixing a mixture containing phosphoric acid and a zinc-containing compound whereby the so-formed slurry mixture is comprised of a mixture of zinc hydrogen phosphates and exhibits a $P_2O_5$/ZnO weight ratio mixture range between about 1.2 to 2.0;

(b) heating the so-formed slurry mixture to a temperature and for a time sufficient to achieve both removal of a sufficient amount of water from the so-formed slurry mixture and a phase transformation of the zinc hydrogen phosphates, whereby the resultant zinc-phosphate material comprises a solid granular mixture of zinc metaphosphates and zinc pyrophosphates;

(c) cooling the resultant zinc-phosphate material to room temperature;

(d) crushing the zinc-phosphate material to an appropriate particle size;

(e) providing additional batch materials necessary for the formation of a desired composition of zinc-phosphate glass;

(f) mixing the zinc-phosphate material with the additional batch materials to form a batch mixture, in a proportion required to form the desired zinc-phosphate glass composition;

(g) heating the batch mixture to a temperature and for a time sufficient to produce a homogeneous melt; and (h) cooling the melt to form a zinc-phosphate glass.

7. The method of claim 6 wherein the zinc hydrogen phosphate is a mixture of $ZnH_4P_2O_8 \cdot 2H_2O$ and $Zn(HPO_4) \cdot H_2O$.

8. The method of claim 6 wherein the zinc metaphosphates are represented by the chemical formula $Zn(PO_3)_2$ and the zinc pyrophosphates are represented by the chemical formula $Zn_2P_2O_7$.

9. The method of claim 6 wherein the heating of the so-formed slurry mixture results in the removal of water whereby the resultant zinc-phosphate material exhibits a water content no greater than 5% by weight.

10. The method of claim 6 wherein in step (b) the so-formed slurry mixture is heated to temperature of at least about 400° C. for at least about 1 hour.

11. The method of claim 6 wherein the heating of the so-formed slurry mixture is accomplished through the combination of high temperature spray drying and fluidized bed drying.

12. The method as claimed in claim 6 wherein the resultant zinc phosphate glass consists essentially, expressed in terms of mole percent on the oxide basis, of at least 65% total of 10–55% ZnO, 28–40% $P_2O_5$, 10–35% $R_2O$, wherein $R_2O$ consists of at least two alkali metal oxides in the indicated proportions selected from the group consisting of 0–25% $Li_2O$, 0–25% $Na_2O$, and 0–25% $K_2O$, and up to 35% total of optional ingredients in the indicated proportions selected from the group consisting of 0–10% $Al_2O_3$, 0–15% $B_2O_3$, 0–15% $Cu_2O$, 0–25% $Sb_2O_3$, 0–35% PbO, 0–35% SnO, 0–5% $ZrO_2$, 0–4% $SiO_2$, 0–20% MgO, 0–20% CaO, 0–20% SrO, 0–20% BaO and 0–10% MnO, 0–10% $WO_3$, 0–10% $MoO_3$, 0–5% rare earth metal oxide and 0–5% F, as analyzed in weight percent, wherein $Al_2O_3+B_2O_3$ does not exceed 15%, $WO_3+MoO_3$ does not exceed 15%, and MgO+CaO+SrO+BaO+MnO does not exceed 20%.

13. The method of claim 6, wherein in step (h), while cooling, the melt is simultaneously shaped to form a zinc phosphate glass article of a desired configuration.

\* \* \* \* \*